(12) United States Patent
Xia (10) Patent No.: US 12,353,961 B2
(45) Date of Patent: Jul. 8, 2025

(54) METHOD AND APPARATUS FOR DETERMINING STORAGE LOAD OF APPLICATION

(71) Applicant: SAMSUNG ELECTRONICS CO., LTD., Suwon-si (KR)

(72) Inventor: Wei Xia, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1038 days.

(21) Appl. No.: 17/108,196

(22) Filed: Dec. 1, 2020

(65) Prior Publication Data

US 2021/0201201 A1 Jul. 1, 2021

(30) Foreign Application Priority Data

Dec. 25, 2019 (CN) .......................... 201911355595.1

(51) Int. Cl.
| | | |
|---|---|---|
| *G06N 20/00* | (2019.01) | |
| *G06F 11/30* | (2006.01) | |
| *G06F 11/34* | (2006.01) | |

(52) U.S. Cl.
CPC ........... *G06N 20/00* (2019.01); *G06F 11/302* (2013.01); *G06F 11/3433* (2013.01)

(58) Field of Classification Search
CPC ... G06N 20/00; G06F 11/302; G06F 11/3433; G06F 11/3452
USPC .......................................................... 706/12
See application file for complete search history.

(56) References Cited

U.S. PATENT DOCUMENTS

| | | |
|---|---|---|
| 6,845,456 B1 | 1/2005 | Menezes et al. |
| 7,506,216 B2 | 3/2009 | Bose et al. |
| 7,644,192 B2 | 1/2010 | Dudley et al. |
| 7,945,657 B1 | 5/2011 | McDougall et al. |

(Continued)

FOREIGN PATENT DOCUMENTS

| | | |
|---|---|---|
| CN | 109491616 | 3/2019 |
| CN | 109885469 | 6/2019 |

(Continued)

OTHER PUBLICATIONS

Qi, Y., et al. "A Self-adaptive and Prediction-based I/O Performance Optimization Method", in China Academic Journal Electronic Publishing House, vol. 34, No. 9, 2007, 5 pages.

(Continued)

*Primary Examiner* — Stephen S Hong
*Assistant Examiner* — Broderick C Anderson
(74) *Attorney, Agent, or Firm* — MORGAN, LEWIS & BOCKIUS LLP (57) ABSTRACT

A method includes acquiring statistic data of a storage load, inputting the statistic data, and determining read/write request tracking data of the storage load. The acquired statistic data of a storage load may be generated by an application in a predetermined time period. The determined read/write request tracking data of the storage load may be during the predetermined time period through the pre-trained machine learning model. The statistic data may include global statistic information corresponding to read/write requests generated by the application in a predetermined time period. The read/write request tracking data may be information of each read/write request generated by the application in a predetermined time period.

13 Claims, 3 Drawing Sheets

(56) References Cited

U.S. PATENT DOCUMENTS

| | | | |
|---|---|---|---|
| 8,898,096 | B2 | 11/2014 | Caves et al. |
| 9,298,633 | B1* | 3/2016 | Zhao ................... G06F 12/0862 |
| 9,846,627 | B2 | 12/2017 | Solihin et al. |
| 9,921,866 | B2 | 3/2018 | Ganguli et al. |
| 11,087,826 | B2 | 8/2021 | Yang et al. |
| 11,250,308 | B2 | 2/2022 | Lee et al. |
| 2015/0347040 | A1* | 12/2015 | Mathur ................. G06F 3/0659 711/103 |
| 2017/0168729 | A1* | 6/2017 | Faulkner ............... G06F 3/0613 |
| 2018/0121366 | A1 | 5/2018 | Tian |
| 2018/0300060 | A1 | 10/2018 | Kesavan et al. |
| 2020/0097810 | A1* | 3/2020 | Hetherington ......... G06N 20/20 |
| 2022/0155970 | A1* | 5/2022 | Lu ......................... G06F 3/0683 |

FOREIGN PATENT DOCUMENTS

| | | |
|---|---|---|
| CN | 110286948 | 9/2019 |
| KR | 10-2017-0136357 A | 12/2017 |
| KR | 10-2019-0076693 A | 7/2019 |

OTHER PUBLICATIONS

Examination report dated Feb. 19, 2025, in corresponding Korean Patent Application No. 10-2020-0160095, 6 pages.

\* cited by examiner

METHOD AND APPARATUS FOR DETERMINING STORAGE LOAD OF APPLICATION

CROSS-REFERENCE TO RELATED APPLICATION

This application claims priority to, and the benefit of, Chinese Application Serial No. 201911355595.1 filed on Dec. 25, 2019. The entire contents of the foregoing application are hereby incorporated by reference for all purposes.

TECHNICAL FIELD

The present disclosure generally relates to storage load optimization, and more specifically relates to a method and apparatus for determining storage load of an application.

BACKGROUND ART

Internet of things includes use of real-world objects that are connected to the internet and are configured with sensors, software, etc. The Internet of Things may pose challenges regarding storage load of programs. When a storage load of a program is large, the load may cause the performance of the program to be decreased. Time delay, data loss, etc. are examples of degraded performance characteristics of a program associated with a large storage load. Learning histories of the storage load of the application provides the ability to predict and adjust the storage load in a subsequent time period, as well as ensure the stability of the application.

Conditions of the storage load may be analyzed using read/write requests (i.e. input/output (I/O) requests) that tracks data of the storage load in real-time. The read/write request tracking data records information of each read/write request and may analyze time/space distribution characteristics of the storage load and serve as data for analyzing the storage load of the application. The descriptive information of each read/write request may be obtained by parsing the received read/write request of the storage load, and recording and storing the parsed data. Usage of more resources influences the performance of the application in processing other operations.

Statistic data influences the performance of the application. Statistic data may reflect the statistic overview of all read/write requests generated by the storage load in a predetermined time period. However, more descriptive information of each read/write request generated by the storage load (e.g., read/write request tracking data) may not be practical to record. Therefore, the statistic data can reflect the overall condition of the storage load, but statistic data may not provide detailed information of the storage load. Improved techniques for analyzing storage load of an application may be desired.

SUMMARY

Exemplary embodiments of the present disclosure lie in providing a method and apparatus for determining a storage load of an application which may overcome the defect that pressure conditions of a storage load of an application cannot be learned when performance of the application is guaranteed and fewer resources are occupied.

According to some exemplary embodiments of the present disclosure, a method for determining a storage load of an application is provided, the method including: acquiring statistic data of the storage load generated by the application in a predetermined time period (e.g., or time duration); and inputting the statistic data to a machine learning model (e.g., a pre-trained machine learning model), and determining read/write request tracking data of the storage load in the predetermined time period based on the machine learning model, wherein the statistic data comprises global statistic information of all read/write requests generated by the application in a predetermined time period, and the read/write request tracking data comprises descriptive information of each read/write request generated by the application in a predetermined time period. Such a method may be implemented to learn pressure conditions of the storage load of the application while guaranteeing performance of the application and not occupying more resources.

In some examples, the global statistic information comprises a statistic characteristic value based on (e.g., obtained by performing) statistic processing of first descriptive data obtained by parsing the all of read/write requests (e.g., by parsing all read/write requests) and the descriptive information (e.g., of any one of read/write requests) comprises descriptive data obtained by parsing the one of read/write request.

In some examples, the machine learning model is trained by acquiring historical statistic data and historical read/write request tracking data of the storage load generated by the application in at least one service processing cycle, wherein the historical statistic data and the historical read/write request tracking data maintain correspondence in a time sequence, and the at least one service processing cycle comprises a time period that the application takes to process historical read/write requests generated in a historical predetermined time period; and training the machine learning model using the acquired historical statistic data and historical read/write request tracking data.

In some examples, the training the machine learning model using the historical statistic data and the historical read/write request tracking data includes: inputting the acquired historical statistic data to the machine learning model; determining a similarity between output read/write request tracking data output by the machine learning model and the historical read/write request tracking data corresponding to the historical statistic data input to the machine learning model; comparing the similarity with a predetermined threshold value; adjusting a hyper-parameter or a weight of the machine learning model based on the similarity being less than the predetermined threshold value; and determining the machine learning model is trained when the similarity is greater than or equal to the predetermined threshold value. Here, since the historical statistic data and historical read/write request tracking data generated by the application in at least one service processing cycle are taken by the machine learning model as a training sample while training the machine learning model, the trained machine learning model may be enabled to be more accurate. In addition, adjusting the hyper-parameter or weight may improve performance and effectiveness of the machine learning.

In some cases, the statistic data includes at least one of a number of read requests generated in the predetermined time period, a number of write requests generated in the predetermined time period, an overall number of the all read/write requests (e.g., read and write requests) generated in the predetermined time period, a first percentage of the number of read/write requests generated in the predetermined time period compared to the overall number of the all read/write requests, a second percentage of the number of write requests generated in the predetermined time period compared to in the overall number of the all read/write requests, an overall storage capacity requested by the all read/write requests generated in the predetermined time period, a distribution of storage capacities requested by the all read/write requests generated in the predetermined time period, a distribution of request time stamps of the all read/write requests generated in the predetermined time period, a distribution of logical addresses requested by the all read/write requests generated in the predetermined time period, and a distribution of processes to which the all read/write requests generated in the predetermined time period belong, wherein the read/write request tracking data includes at least one of a storage capacity requested by the each read/write request generated in the predetermined time period, a type of the each read/write request generated in the predetermined time period, a process to which the each read/write request generated in the predetermined time period belongs, a request time stamp of the each read/write request generated in the predetermined time period, and a logical address requested by the each read/write request generated in the predetermined time period.

According to other aspects of exemplary embodiments of the present disclosure, an apparatus for determining a storage load of an application is provided, the apparatus including: an acquiring unit to acquire statistic data of the storage load generated by the application in a predetermined time period; and a processing unit to input the statistic data to a machine learning model (e.g., a pre-trained machine learning model), and determine read/write request tracking data of the storage load in a predetermined time period based on (e.g., through) the machine learning model, wherein the statistic data comprises global statistic information of all read/write requests generated by the application in the predetermined time period, and the read/write request tracking data comprises descriptive information of each read/write request generated by the application during (e.g., in) the predetermined time period. Such may be implemented to learn pressure conditions of the storage load of the application while guaranteeing performance of the application and not occupying more resources.

In some examples, the global statistic information comprises a statistic characteristic value based on (e.g., obtained by) performing statistic processing of first descriptive data obtained by parsing the all read/write requests, and the descriptive information of a read/write request comprises second descriptive data obtained by parsing the read/write request.

In some examples, the processing unit trains the machine learning model in by acquiring historical statistic data and historical read/write request tracking data of the storage load generated by the application in at least one service processing cycle, and training the machine learning model using the historical statistic data and the historical read/write request tracking data, wherein the historical statistic data and the historical read/write request tracking data maintain correspondence in a time sequence, and the at least one service processing cycle comprises a time period that the application takes to process historical read/write requests generated in a historical predetermined time period. Since the historical statistic data and the historical read/write request tracking data generated by the application in at least one service processing cycle are taken by the machine learning model as a training sample while training the machine learning model, the trained machine learning model may be enabled to be more accurate. In addition, adjusting the hyper-parameter or weight may help improve performance and effectiveness of machine learning.

In some examples, the processing of training the machine learning model using the acquired historical statistic data and historical read/write request tracking data includes: inputting the historical statistic data to the machine learning model; determining a similarity between output read/write request tracking data output by the machine learning model and the historical read/write request tracking data corresponding to the historical statistic data input to the machine learning model; comparing the similarity with a predetermined threshold value; adjusting a hyper-parameter or a weight of the machine learning model based on the similarity being less than the predetermined threshold value; and determining the trained machine learning model is trained when the similarity is greater than or equal to the predetermined threshold value. Here, adjusting the hyper-parameter or the weight may help improve performance and effectiveness of the machine learning.

Alternatively, the statistic data includes at least one of a number of read requests generated in the predetermined time period, a number of write requests generated in the predetermined time period, an overall number of the all read and write requests generated in the predetermined time period, a first percentage of the number of read requests generated in the predetermined time period compared to the overall number of the all read/write requests, a second percentage of the number of write requests generated in the predetermined time period compared to in the overall number of the all read/write requests, an overall storage capacity requested by the all read/write requests generated in the predetermined time period, a distribution of storage capacities requested by the all read/write requests generated in the predetermined time period, a distribution of request time stamps of the all read/write requests generated in the predetermined time period, a distribution of logical addresses requested by the all read/write requests generated in the predetermined time period, and a distribution of processes to which the all read/write requests generated in the predetermined time period belong, wherein the read/write request tracking data includes at least one of a storage capacity requested by the each read/write request generated in the predetermined time period, a type of each read/write request generated in the predetermined time period, a process to which the each read/write request generated in the predetermined time period belongs, a request time stamp of the each read/write request generated in the predetermined time period, and a logical address requested by the each read/write request generated in the predetermined time period.

According to another aspect of exemplary embodiments of the present disclosure, an electronic apparatus is provided, the electronic apparatus including: a processor; and a storage storing a computer program and implementing the method of determining a storage load of an application according to the present disclosure when the computer program is executed by the processor.

According to another aspect of exemplary embodiments, a computer-readable storage medium storing a computer program and implementing the method of determining a storage load of an application according to the present disclosure when the computer program is executed by the processor is provided.

The method and apparatus for determining a storage load of an application according to the exemplary embodiments of the present disclosure may restore the then read/write request tracking data of the storage load to some extent using the historical statistic data of the storage load and, through such a manner, may reproduce time/space distribution characteristics for analyzing the storage load to the largest extent while ensuring performance of the application and not occupying more resources, so as to provide evidence for more profound research on the storage load.

Other aspects and/or advantages in a general concept of the present disclosure may be partially illustrated in the following description, and the rest will be clarified through further description or may be learned through implementation of the general concept of the present disclosure.

BRIEF DESCRIPTION OF THE DRAWINGS

Through the following detailed description made in conjunction with the figures schematically illustrating the embodiments, the above and other purposes of the exemplary embodiments of the present disclosure will become more clear, among the figures.

DETAILED DESCRIPTION OF EXEMPLARY EMBODIMENTS

The present disclosure generally relates to storage load optimization. More particularly, the present disclosure relates to a method and apparatus for determining storage load of an application. In some embodiments, the present disclosure uses machine learning and workload read/write statistic data of an application to recover missing temporal and spatial information (e.g., missing read/write trace log data with temporal and spatial information).

For example, a workload read/write time-series trace log and workload read/write statistic data may be captured to analyze storage load (e.g., application storage workload). A workload read/write time-series trace log may include a captured log of read/write request tracking data (e.g., such as read/write request time, request data location, request type, etc.). Workload read/write statistic data may include statistical data recorded during a certain period of time (e.g., a number of read/write requests recording over a period of time, an average read/write request size over a period of time, etc.). However, a workload read/write time-series trace log may be large and may be associated with large amounts of data such that capturing a large scale workload read/write time-series trace log may be impractical. Moreover, workload read/write statistic data may be collectable at a large scale, but the workload read/write statistic data may not include detailed read/write request information included in a workload read/write time-series trace log.

According to the techniques described herein, statistic data (e.g., workload read/write statistic data) and read/write information (e.g., input/output (I/O) information) may be connected to each other (e.g., read/write information may be obtained from captured statistic data). For instance, using a trained learning model, the present disclosure may bridge the gap between statistic data and I/O information such that statistic data may be recorded and read/write information may be obtained from the statistic data via the trained learning model (e.g., read/write information may be analyzed without capturing and recording a large read/write time-series trace log). The method of the present disclosure includes acquiring statistic data of a storage load, inputting the statistic data into a trained learning model, and determining read/write request tracking data (e.g., read/write information) of the storage load. In some examples, the acquired statistic data of a storage load may be generated by an application in a predetermined time period (e.g., or for a predetermined time duration). The read/write request tracking data of the storage load may be determined during the predetermined time period through the pre-trained learning model (e.g., through a machine learning model trained using processed statistic data as input data and read/write trace log data as reference for establishing relationship connections for the machine learning model).

Exemplary embodiments of the present disclosure will be referenced, and examples of the embodiments are illustrated in the figures in which the same reference numerals refer to the same parts. Hereinafter, embodiments of the present disclosure will be explained with reference to the figures to facilitate an explanation of the present disclosure.

Figure 1:
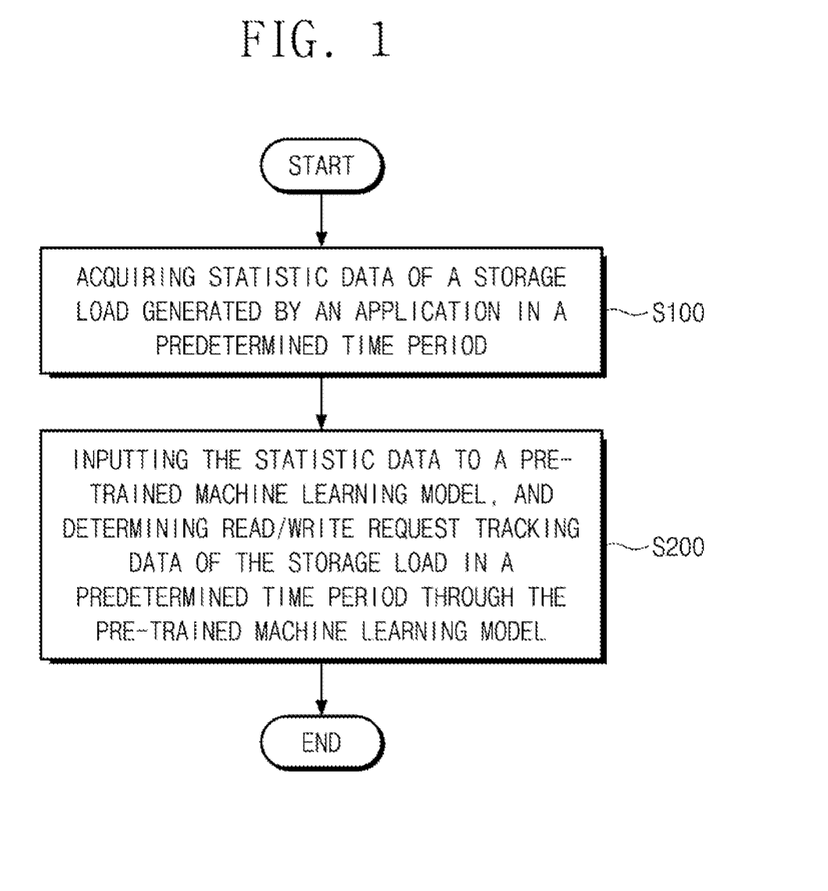
FIG. 1 illustrates a flowchart illustrating a method for determining a storage load of an application according to exemplary embodiments of the present disclosure.

FIG. 1 illustrates a flowchart illustrating a method for determining a storage load of an application according to an exemplary embodiment of the present disclosure. The method may be implemented by an apparatus for determining a storage load of an application in an electronic apparatus, and may also be fully implemented through a computer program. For example, the method may be executed by an application installed on an electronic apparatus, for determining a storage load of the application, or executed by a functional program implemented in an operating system of the electronic apparatus. For example, the electronic apparatus may be an electronic apparatus with artificial intelligence operating functions such as a personal computer, a server, a flat computer, and a smartphone.

Analysis of storage load may refer to the process of inspecting, cleaning, transforming and modeling storage load (e.g., read/write requests of an application). In some cases, storage load analytics systems may include components for discovering useful information, collecting information, informing conclusions and supporting decision-making. Storage load analytics can be used to make decisions in a business, government, science or personal context. In some aspects, storage load analytics may focus on statistical modeling and knowledge discovery for predictive purposes (i.e., as opposed to purely descriptive purposes) for decision making (e.g., such as to inspect or manage application storage load).

As illustrated in FIG. 1, at step S100, statistic data of a storage load generated by an application in a predetermined time period is acquired, where the statistic data may be global statistic information of some or all read/write requests generated by the application in a predetermined time period. For example, global statistic information may be a statistic characteristic value obtained by performing statistic processing on descriptive data obtained by parsing some or all read/write requests.

In particular, through at least one monitoring point disposed on a path where a read/write request of an application is sent to a storage apparatus, the present disclosure may acquire each read/write request of the application that flows through the at least one monitoring point in a predetermined time period, parse the acquired each read/write request, and perform statistical processing (e.g., summation, determining a proportion, determining a distribution, etc.) using descriptive data obtained by parsing each read/write request, to obtain statistic data of the storage load generated by the application in a predetermined time period.

For example, the statistic data may include at least one of a number of read requests generated in a predetermined time period, a number of write requests generated in a predetermined time period, and/or an overall number of read and write requests generated in a predetermined time period. Additionally, the statistic data may include at least one of a percentage that the number of read/write requests generated in a predetermined time period respectively accounts for in the overall number of the read and write requests, an overall storage capacity requested by the read/write requests generated in a predetermined time period, a distribution of storage capacities requested by the read/write requests generated in a predetermined time period, a distribution of request time stamps of the read/write requests generated in a predetermined time period, a distribution of logical addresses requested by the read/write requests generated in a predetermined time period, and a distribution of processes to which the read/write requests generated in a predetermined time period belong.

Additionally or alternatively, although the process of acquiring the statistic data relates to acquiring the descriptive data of the read/write request that flows through the above at least one monitoring point, the acquired statistic data relates to statistics of the descriptive data of the read/write request but does not relate to recording and storage of the descriptive data of the read/write request. Therefore, acquiring the statistic data may not occupy a large amount of resources and may not influence the performance of the application. However, resources may be used if the descriptive data of each read/write request that may comprehensively analyze time/space distribution characteristics of a storage load, recording, and storing of the descriptive data of each read/write request may be performed. The present disclosure may predict read/write request tracking data of a storage load in a predetermined time period (e.g., or for a predetermined time duration) based on a pre-trained machine learning model to overcome the defect. Therefore, the present disclosure may provide evidence for more profound research on the storage load while ensuring the performance of the application and to not occupy more resources.

In particular, at step S200, the present disclosure may input the statistic data to the pre-trained machine learning model and determine the read/write request tracking data of the storage load in a predetermined time period through the pre-trained machine learning model. The read/write request tracking data may be descriptive information of each read/write request generated by the application in a predetermined time period. For example, descriptive information (e.g., read/write request tracking data) of any one of the read/write requests may be descriptive data obtained by parsing the any one of read/write request.

For example, the read/write request tracking data may include at least one of a storage capacity requested by each read/write request generated in a predetermined time period, a type of each read/write request generated in a predetermined time period, a process to which each read/write request generated in a predetermined time period belongs, a request timestamp of each read/write request generated in a predetermined time period, and a logical address requested by each read/write request generated in a predetermined time period.

For example, the above machine learning model may be trained by acquiring historical statistic data and historical read/write request tracking data of the storage load generated by the application in at least one service processing cycle, wherein the acquired historical statistic data and historical read/write request tracking data maintain correspondence in time sequence. The service processing cycle may be a time that the application uses to process read/write requests generated in a predetermined time unit.

Embodiments of the present disclosure extract the historical statistic data and historical read/write request tracking data of the storage load generated by the application in at least one service processing cycle (e.g., in forty-five minutes, in a day, in a week, in a month, etc.). Before the historical statistic data and historical read/write request tracking data are acquired since data formats and time information formats of the historical statistic data and historical read/write request tracking data are inconsistent, the historical statistic data and historical read/write request tracking data have been sorted out. Therefore, the acquired historical statistic data and historical read/write request tracking data maintain correspondence in a time sequence. For example, the statistic data of the storage load acquired from 5:30 to 5:40 on Mar. 5, 2019 corresponds to the read/write request tracking data generated by the storage load from 5:30 to 5:40 on Mar. 5, 2019. Since the present disclosure uses the historical statistic data and historical read/write request tracking data generated by the application in at least one service processing cycle as a training sample while training the machine learning model, the trained machine learning model may be enabled to be more accurate.

According to some aspects of the techniques described herein, a machine learning model is trained using the acquired historical statistic data and historical read/write request tracking data. For example, the steps of training a machine learning model using acquired historical statistic data and historical read/write request tracking data is described in detail with FIG. 2.

In some cases, a machine learning model may include or implement a neural network. A neural network is a type of computer algorithm that is capable of learning specific patterns without being explicitly programmed, but through iterations over known data. A neural network may refer to a cognitive model that includes input nodes, hidden nodes, and output nodes. Nodes in the network may have an activation function that computes whether the node is activated based on the output of previous nodes. Training the system may involve supplying values for the inputs, and modifying edge weights and activation functions (algorithmically or randomly) until the result closely approximates a set of desired outputs.

In some cases, a machine learning model may include or implement a neural network artificial neural network (ANN). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmit the processed signal to other connected nodes. In some cases, the signals between nodes comprise real numbers, and the output of each node is computed by a function of the sum of its inputs. Each node and edge is associated with one or more node weights that determine how the signal is processed and transmitted.

During the training process, such weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Figure 2:
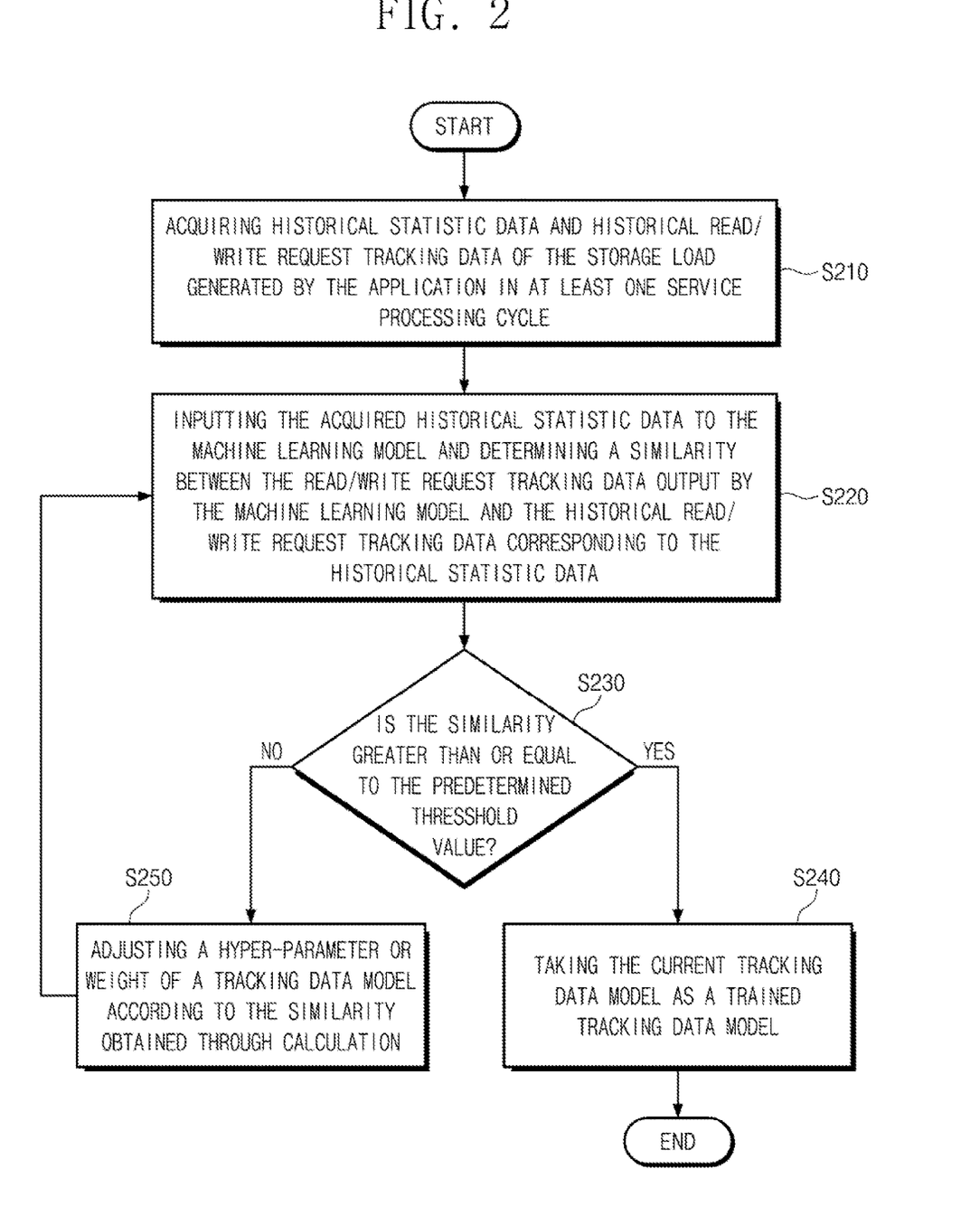
FIG. 2 illustrates a flowchart illustrating steps of training a machine learning model according to exemplary embodiments of the present disclosure.

In particular, as illustrated in FIG. 2, after the historical statistic data and historical read/write request tracking data of the storage load generated by the application are acquired at step S210, at step S220, the acquired historical statistic data is input to the machine learning model and a similarity between the read/write request tracking data output by the machine learning model and the historical read/write request tracking data corresponding to the input historical statistic data is determined. A similarity determining method may be used to determine the similarity. Therefore, no definition is made to a specific similarity determining method in the present disclosure.

At step S230, the similarity and a predetermined threshold value are compared. For example, the present disclosure may determine whether the similarity is greater than or equal to the predetermined threshold value.

When the similarity is greater than or equal to the predetermined threshold value, at step S240, a machine learning model is used as a trained machine learning model.

When the similarity is less than the predetermined threshold value, at step S250, a hyper-parameter or weight of the machine learning model is adjusted based on the similarity. For example, the similarity may represent a degree of difference between a logical value and a standard value. In the training process, the higher the similarity is, the more stable the machine learning model is.

The term 'hyper-parameter' may be a parameter set before a start of a learning process in a context of machine learning, for example, a learning rate, the number of hidden layers of a deep neural network, the number of clusters in k-means clustering, and the like. Generally, the hyper-parameter may be optimized according to similarity conditions of the machine learning model to increase learning performance and effect. For example, when the similarity is less than the predetermined threshold value, an output, i.e., a loss value, of a loss function of the machine learning model may be determined based on the similarity. When the loss value is less than a threshold value of the loss value and repeatedly oscillates around one numerical value, a training process of the machine learning model may be made more smooth by reducing a learning rate of the machine learning model, thereby speeding up to obtain a trained machine learning model.

Similarly, a weight of the machine learning model may also be adjusted according to the similarity using the similarity determining method to increase learning performance and effect. Correspondingly, the accuracy of the weight of the machine learning model increases along with the increase in the number of times of machine learning model training.

After the hyper-parameter and/or weight of the machine learning model is adjusted using the similarity determining method, the present disclosure may return to execute step S220, continue to input the acquired historical statistic data (e.g., the historical statistic data that has been input to the machine learning model or the historical statistic data that has not been input to the machine learning model) to the machine learning model. Embodiments of the present disclosure may then continue to determine a similarity between the read/write request tracking data output from the machine learning model and the historical read/write request tracking data corresponding to the input historical statistic data. The above steps are repeated until the similarity is greater than or equal to the predetermined threshold value, and may not stop until a trained machine learning model is obtained.

Additionally or alternatively, after the read/write request tracking data of the storage load in a predetermined time period is predicted using the statistic data, the present disclosure may use the obtained read/write request tracking data as evidence for estimating conditions of the storage load in a predetermined time period to provide referable data for adjusting the storage load of the application.

The method for determining a storage load of an application according to exemplary embodiments of the present disclosure may restore the then read/write request tracking data of the storage load to some extent using the historical statistic data of the storage load, and, through such a manner, may reproduce time/space distribution characteristics for analyzing the storage load to the largest extent while ensuring the performance of the application and to not occupy more resources, to provide evidence for more profound research on the storage load.

Figure 3:
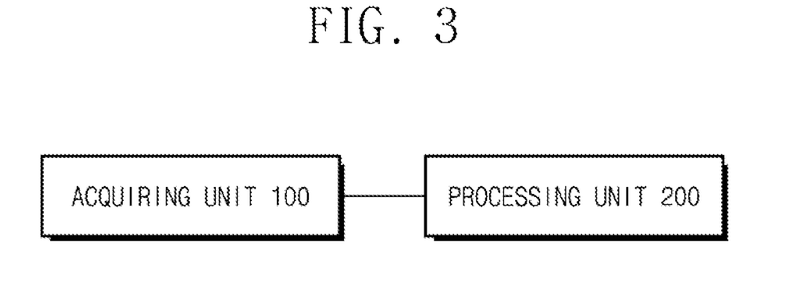
FIG. 3 illustrates a block diagram illustrating an apparatus for determining a storage load of an application according to exemplary embodiments of the present disclosure.

FIG. 3 illustrates a block diagram illustrating an apparatus for determining a storage load of an application according to an exemplary embodiment of the present disclosure. For example, the electronic apparatus may be electronic an apparatus that has artificial intelligence operating functions such as a personal computer, a server, a flat computer, and a smartphone.

As illustrated in FIG. 3, the apparatus for determining a storage load of an application according to an exemplary embodiment of the present disclosure includes an acquiring unit 100 and a processing unit 200.

The acquiring unit 100 acquires statistic data of a storage load generated by an application in a predetermined time period, wherein the statistic data may be global statistic information of some or all read/write requests generated by the application in a predetermined time period. For example, the global statistic information may be a statistic characteristic value obtained by performing statistic processing on descriptive data obtained by parsing some or all read/write requests.

In particular, through at least one monitoring point disposed on a path where a read/write request of an application is sent to a storage apparatus, the acquiring unit 100 may acquire each read/write request of the application that flows through the at least one monitoring point in a predetermined time period, parse the acquired each read/write request, and perform statistical processing (e.g., summation, determining a proportion, determining a distribution, etc.) using descriptive data obtained by parsing each read/write request, to obtain statistic data of the storage load of the application generated in a predetermined time period.

For example, the statistic data may include at least one of the number of read requests generated in a predetermined time period, the number of write requests generated in a predetermined time period, the overall number of read and write requests generated in a predetermined time period, a percentage that the number of read/write requests generated in a predetermined time period respectively accounts for in the overall number of the read and write requests, an overall storage capacity requested by the read/write requests generated in a predetermined time period, a distribution of storage capacities requested by the read/write requests generated in a predetermined time period, a distribution of request time stamps of the read/write requests generated in a predetermined time period, a distribution of logical addresses requested by the read/write requests generated in a predetermined time period, and a distribution of processes to which the read/write requests generated in a predetermined time period belong.

Additionally or alternatively, although the process of the acquiring unit 100 acquiring the statistic data relates to acquiring the descriptive data of the read/write request that flows through the above at least one monitoring point, the acquired statistic data relates to statistics of the descriptive data of the read/write request, but does not relate to recording and storage of the descriptive data of the read/write request. Therefore, the manner of acquiring statistic data may not use a large amount of resources and may not influence on the performance of an application. However, if the descriptive data of each read/write request that may comprehensively analyze time/space distribution characteristics of a storage load, the descriptive data of each read/write request may be recorded and stored, resulting in high usage of resources. The present disclosure may predict the read/write request tracking data of the storage load in a predetermined time period based on the pre-trained machine learning model to overcome the defect. Therefore, the present disclosure may provide evidence for more profound research on details and pressure playback of the storage load while ensuring the performance of the application and not occupying more resources.

The time period (or time duration) over which statistic data of a storage load generated by an application may be acquired (e.g., the predetermined time period) may be predetermined based on the application, based on an I/O controller handling the read/write requests, etc. For instance, the predetermined time period may be predetermined (e.g., determined prior to the acquiring of statistic data, determined prior to inputting statistic data into the pre-trained machine learning model, etc.) based on storage capacity of a processor or an I/O controller, processing capabilities of a processor or an I/O controller, etc. In some examples, the predetermined time period may be based on one or more characteristics of the machine learning model (e.g., based on processing time of the machine learning model, based on a similarity between output read/write request tracking data output by the machine learning model and the historical read/write request tracking data corresponding to the historical statistic data input to the machine learning model, etc.).

In particular, the processing unit 200 may input the statistic data to the pre-trained machine learning model and determine the read/write request tracking data of the storage load in a predetermined time period through the pre-trained machine learning model. The read/write request tracking data may be descriptive information of each read/write request generated by the application in a predetermined time period. For example, descriptive information of any one of read/write requests may be descriptive data obtained by parsing the any one of read/write request. In some cases, descriptive information of one or more read/write requests may be referred to as read/write request tracking data for on or more read/write requests.

For example, the read/write request tracking data may include at least one of a storage capacity requested by each read/write request generated in a predetermined time period, a type of each read/write request generated in a predetermined time period, a process to which each read/write request generated in a predetermined time period belongs, a request time stamp of each read/write request generated in a predetermined time period, and a logical address requested by each read/write request generated in a predetermined time period.

For example, the processing unit 200 may train the machine learning model in the following manner.

The processing unit 200 acquires the historical statistic data and historical read/write request tracking data of the storage load generated by the application in at least one service processing cycle. The acquired historical statistic data and historical read/write request tracking data maintain correspondence in time sequence. The service processing cycle may be time that the application uses to process read/write requests generated in a predetermined time unit.

The processing unit 200 may extract the historical statistic data and historical read/write request tracking data of the storage load generated by the application in at least one service processing cycle (e.g., in forty-five minutes, in a day, in a week, in a month, etc.). The historical statistic data and historical read/write request tracking data are sorted before the historical statistic data and historical read/write request tracking data are acquired since data formats and time information formats of the historical statistic data and historical read/write request tracking data are inconsistent. Therefore, the acquired historical statistic data and historical read/write request tracking data maintain correspondence in a time sequence. For example, the statistic data of the storage load acquired from 5:30 to 5:40 on Mar. 5, 2019 corresponds to the read/write request tracking data generated by the storage load from 5:30 to 5:40 on Mar. 5, 2019. The trained machine learning model may be enabled to be more accurate since the trained machine learning model uses the historical statistic data and historical read/write request tracking data generated by the application in at least one service processing cycle as a training sample while training the machine learning model.

The processing unit 200 trains the machine learning model using the acquired historical statistic data and historical read/write request tracking data.

As an example embodiment, regarding the processing of training the machine learning model using the acquired historical statistic data and historical read/write request tracking data, the present disclosure may input the acquired historical statistic data to the machine learning model and determine a similarity between the read/write request tracking data output from the machine learning model and the historical read/write request tracking data corresponding to the input historical statistic data.

The similarity and a predetermined threshold value are compared, for example, the present disclosure may determine whether the similarity is greater than or equal to the predetermined threshold value.

When the similarity is greater than or equal to the predetermined threshold value, a machine learning model is used as a trained machine learning model. When the similarity is less than the predetermined threshold value, a hyper-parameter or weight of the machine learning model is adjusted based on the similarity. For example, the similarity may represent a degree of difference between a logical value and a standard value. In the training process, the higher the similarity is, the more stable the machine learning model is.

A hyper-parameter may be a parameter set before a start of a learning process in a context of machine learning, for example, a learning rate, the number of hidden layers of a deep neural network, the number of clusters in k-means clustering, and the like. Generally, the hyper-parameter may be optimized according to similarity conditions of the machine learning model to increase learning performance and effect. For example, when the similarity is less than the predetermined threshold value, an output, i.e., a loss value, of a loss function of the machine learning model may be determined based on the similarity. When the loss value is less than a threshold value of the loss value and repeatedly oscillates around one numerical value, a training process of the machine learning model may be made more smooth by reducing a learning rate of the machine learning model, thereby speeding up to obtain a trained machine learning model.

Similarly, a weight of the machine learning model may also be adjusted according to the similarity using the similarity determining method to increase learning performance and effect. Correspondingly, the accuracy of the weight of the machine learning model increases along with the increase in the number of times of machine learning model training.

After the hyper-parameter or weight of the machine learning model is adjusted in similarity determining method, the processing unit 200 may continue to input the acquired historical statistic data (e.g., the historical statistic data that has been input to the machine learning model or the historical statistic data that has not been input to the machine learning model) to the machine learning model, and continue to determine a similarity between the read/write request tracking data output from the machine learning model and the historical read/write request tracking data corresponding to the input historical statistic data. The above processing is repeated until the similarity is greater than or equal to the predetermined threshold value, and may not stop until a trained machine learning model is obtained.

Additionally or alternatively, after the read/write request tracking data of the storage load in a predetermined time period is predicted using the statistic data, the present disclosure may use the obtained read/write request tracking data as evidence for estimating conditions of the storage load in a predetermined time period to provide referable data for adjusting the storage load of the application.

In some cases, read/write requests may be handled or managed by an I/O controller. An I/O controller may manage input and output signals for a device. An I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

Additionally or alternatively, respective units in the apparatus for determining a storage load of an application according to exemplary embodiments of the present disclosure may be implemented as hardware components and/or software components. According to the processing executed by the respective defined units, those skilled in the art may, for example, use a field-programmable gate array (FPGA) or an application-specific integrated circuit (ASIC) to implement respective units.

A computer-readable storing medium, according to exemplary embodiments of the present disclosure, stores a computer program. A processor executes the method for determining a storage load of an application in the above exemplary embodiment while being executed by the processor. The computer-readable storing medium is a storage device that may store any data of data read out by a computer system. Examples of a computer-readable storing medium include a read-only memory, a random-access memory, a CD-ROM, a magnetic tape, a floppy disk, an optical data storage device, and a carrier (such as data transmission via Internet through a wired or wireless transmission path).

In some examples, an application may be implemented via software. Software may include code to implement aspects of the present disclosure. Software may be stored in a non-transitory computer-readable medium such as system memory or other memory. In some cases, the software may not be directly executable by the processor but may cause a computer (e.g., when compiled and executed) to perform functions described herein.

The electronic apparatus, according to exemplary embodiments of the present disclosure, includes a processor (not shown) and storage (not shown), wherein the storage stores a computer program implementing the method for determining a storage load of an application described in the above exemplary embodiment when the computer program is executed by the processor. The storage may be a nonvolatile memory (NVM), but the present disclosure is not limited thereto. For example, examples of a nonvolatile memory include Intel NVM: Intel DCPMM, Intel Auteng Mixed SSD: Intel H10, and Micron 3D SSD: Micron 3DXpoint X100 and SSD.

The method and apparatus of the present disclosure used for determining a storage load of an application, the present disclosure may restore the read/write request tracking data of the storage load to some extent using the historical statistic data of the storage load, and reproduce time/space distribution characteristics for analyzing the storage load to the largest extent while ensuring the performance of the application and not occupying more resources, to provide evidence for more profound research on the storage load.

Even if the present disclosure has been particularly shown and described with reference to exemplary embodiments thereof, it shall be understood by those skilled in the art that various changes in form and details may be made therein without departing from the spirit and scope of the present disclosure as defined by the claims.

What is claimed is:

1. A method for determining a storage load of an application occupying resources of a computer apparatus, comprising:
   acquiring statistic data of the storage load, wherein the statistic data comprises global statistic information for a plurality of read/write requests generated by the application executing on the computer apparatus over a predetermined time period;
   inputting the statistic data to a machine learning model;
   determining, using the machine learning model, predicted read/write request tracking data of the storage load, wherein the machine learning model comprises an input layer that takes as input the global statistics information including a number of the plurality of read/write requests and an output layer that generates as output the predicted read/write request tracking data including individual information for each of the plurality of read/write requests for the predetermined time period,
   wherein the predicted read/write request tracking data comprises descriptive information corresponding to data obtained by parsing the plurality of read/write requests generated by the application in the predetermined time period; and
   reducing, in a subsequent period following the predetermined time period, the storage load of the application occupying the resources of the computer apparatus using the predicted read/write request tracking data, wherein the reducing of the storage load of the application executing on and occupying resources of the computer apparatus is performed using the machine learning model to determine additional predicted read/write request tracking data of the storage load in the subsequent period without recording and storing descriptive data of read/write requests.

2. The method of claim 1, wherein the global statistic information comprises a statistic characteristic value based on statistic processing of first descriptive data obtained by the parsing of the plurality of read/write requests, and the descriptive information comprises second descriptive data obtained by the parsing of the plurality of read/write requests.

3. The method of claim 1, further comprising:
acquiring historical statistic data and historical read/write request tracking data of the storage load generated by the application in at least one service processing cycle, wherein the historical statistic data and the historical read/write request tracking data maintain correspondence in a time sequence, and the at least one service processing cycle comprises a time period that the application takes to process historical read/write requests generated in a historical predetermined time period; and
training the machine learning model using the historical statistic data and the historical read/write request tracking data.

4. The method of claim 3, wherein the training the machine learning model using the historical statistic data and the historical read/write request tracking data comprises:
inputting the historical statistic data to the machine learning model;
determining a similarity between output read/write request tracking data output by the machine learning model and the historical read/write request tracking data corresponding to the historical statistic data input to the machine learning model;
comparing the similarity with a predetermined threshold value;
adjusting a hyper-parameter or a weight of the machine learning model based on the similarity being less than the predetermined threshold value; and
determining the machine learning model is trained when the similarity is greater than or equal to the predetermined threshold value.

5. The method of claim 1, wherein the statistic data comprises at least one of: a number of read requests generated in the predetermined time period, a number of write requests generated in the predetermined time period, an overall number of the plurality of read/write requests generated in the predetermined time period, a first percentage of the number of read requests generated in the predetermined time period compared to the overall number of the plurality of read/write requests, a second percentage of the number of write requests generated in the predetermined time period compared to in the overall number of the plurality of read/write requests, an overall storage capacity requested by the plurality of read/write requests generated in the predetermined time period, a distribution of storage capacities requested by the plurality of read/write requests generated in the predetermined time period, a distribution of request time stamps of the plurality of read/write requests generated in the predetermined time period, a distribution of logical addresses requested by the plurality of read/write requests generated in the predetermined time period, and a distribution of processes to which the plurality of read/write requests generated in the predetermined time period belong; and wherein the read/write request tracking data comprises at least one of: a storage capacity requested by each of the plurality of read/write request generated in the predetermined time period, a type of each of the plurality of read/write request generated in the predetermined time period, a process to which each of the plurality of read/write request generated in the predetermined time period belongs, a request time stamp of each of the plurality of read/write request generated in the predetermined time period, and a logical address requested by each of the plurality of read/write request generated in the predetermined time period.

6. An apparatus for determining a storage load of an application occupying resources of the apparatus, comprising:
an acquiring unit configured to acquire statistic data of the storage load, wherein the statistic data comprises global statistic information for a plurality of read/write requests generated by the application in a predetermined time period and acquired at a monitoring point of the apparatus disposed on a path to a storage apparatus; and
a processing unit configured to input the statistic data to a machine learning model, determine, using the machine learning model, predicted read/write request tracking data of the storage load, and reduce, in a subsequent period following the predetermined time period, the storage load of the application occupying the resources of the apparatus using the predicted read/write request tracking data, wherein the machine learning model comprises an input layer that takes as input the global statistics information including a number of the plurality of read/write requests and an output layer that generates as output the predicted read/write request tracking data including individual information for each of the plurality of read/write requests in the predetermined time period,
wherein the predicted read/write request tracking data comprises descriptive information corresponding to data obtained by parsing the plurality of read/write requests generated by the application in the predetermined time period, and
wherein the processing unit is further configured to reduce the storage load of the application executing on and occupying resources of the apparatus using the machine learning model to determine additional predicted read/write request tracking data of the storage load in the subsequent period without recording and storing descriptive data of read/write requests.

7. The apparatus of claim 6, wherein the global statistic information comprises a statistic characteristic value based on statistic processing of first descriptive data obtained by parsing the plurality of read/write requests, and the descriptive information comprises second descriptive data obtained by parsing the plurality of read/write requests.

8. The apparatus of claim 6, wherein the processing unit is further configured to:
acquire historical statistic data and historical read/write request tracking data of the storage load generated by the application in at least one service processing cycle; and
train the machine learning model using the historical statistic data and the historical read/write request tracking data, wherein the historical statistic data and the historical read/write request tracking data maintain correspondence in a time sequence, and the at least one service processing cycle comprises a time that period the application takes to process historical read/write requests generated in a historical predetermined time period.

9. The apparatus of claim 8, wherein the processing unit is configured to train the machine learning model using the historical statistic data and the historical read/write request tracking data by being configured to:
   input the historical statistic data to the machine learning model;
   determine a similarity between output read/write request tracking data output by the machine learning model and the historical read/write request tracking data corresponding to the historical statistic data input to the machine learning model;
   compare the similarity with a predetermined threshold value;
   adjust a hyper-parameter or a weight of the machine learning model based on the similarity being less than the predetermined threshold value; and
   determine the machine learning model is trained when the similarity is greater than or equal to the predetermined threshold value.

10. The apparatus of claim 6, wherein the statistic data comprises at least one of:
   a number of read requests generated in the predetermined time period, a number of write requests generated in the predetermined time period, an overall number of read and write requests generated in the predetermined time period, a first percentage of the number of read requests generated in the predetermined time period compared to the overall number of the read and write requests, a second percentage of the number of write requests generated in the predetermined time period compared to in the overall number of the plurality of read/write requests, an overall storage capacity requested by the plurality of read/write requests generated in the predetermined time period, a distribution of storage capacities requested by the plurality of read/write requests generated in the predetermined time period, a distribution of request time stamps of the plurality of read/write requests generated in the predetermined time period, a distribution of logical addresses requested by the plurality of read/write requests generated in the predetermined time period, and a distribution of processes to which the plurality of read/write requests generated in the predetermined time period belong; and
   wherein the read/write request tracking data comprises at least one of: a storage capacity requested by each of the plurality of read/write request generated in the predetermined time period, a type of each of the plurality of read/write request generated in the predetermined time period, a process to which each of the plurality of read/write request generated in the predetermined time period belongs, a request time stamp each of the plurality of read/write request generated in the predetermined time period, and a logical address requested by each of the plurality of read/write request generated in the predetermined time period.

11. The method of claim 1, further comprising adjusting, in the second subsequent period, the storage load of the application executing on and occupying resources of the computer apparatus using the additional predicted read/write request tracking data.

12. The method of claim 1, wherein acquiring the statistic data of the storage load further comprises acquiring the plurality of read/write requests of the application that flow through a monitoring point of the computer apparatus disposed on a path to a storage apparatus in the predetermined time period.

13. The method of claim 1, further comprising storing the predicted read/write request tracking data to provide referable data for adjusting the storage load of the application, wherein the referable data corresponds to a storage load that is less than a storage load corresponding to the plurality of read/write requests.

* * * * *